United States Patent [19]
Baldwin et al.

[11] 3,942,409
[45] Mar. 9, 1976

[54] SINGLE RAIL MISSILE LAUNCHER WITH SHIFT REGISTER TIMING

[75] Inventors: Lawrence W. Baldwin, Canoga Park; Avinoam S. Zerkowitz, Woodland Hills, both of Calif.

[73] Assignee: Hughes Aircraft Company, Culver City, Calif.

[22] Filed: Feb. 8, 1974

[21] Appl. No.: 440,886

[52] U.S. Cl. .............................................. 89/1.814
[51] Int. Cl.² ........................................... F41F 3/06
[58] Field of Search ........................ 89/1.813, 1.814

[56] References Cited
UNITED STATES PATENTS

| | | | |
|---|---|---|---|
| 3,735,668 | 5/1973 | Langlois et al. ................... | 89/1.814 |
| 3,745,877 | 7/1973 | Dobson ............................. | 89/1.814 |

*Primary Examiner*—Stephen C. Bentley
*Attorney, Agent, or Firm*—W. H. MacAllister; F. I. Konzem

[57] ABSTRACT

A digital launch sequence timing network in a single rail launcher which interprets signals from the aircraft and generates the signals necessary to automatically prepare and launch a missile. In order to launch the missile, a number of signals must be sent from the launcher to the missile in a particular time sequence. The launcher must first send an activate pulse to the missile battery which lasts for a predetermined amount of time, until the missile battery reaches its operational condition. Next, the launcher delivers a pulse to activate the missile rocket motor to provide the propulsion needed by the missile when it leaves the launcher. The preparation steps needed to prepare and launch the missile must take place in an exact time sequence which is provided by the digital timing network, composed of several shift registers. The single rail launcher is used for carrying and launching the maverick missile.

1 Claim, 4 Drawing Figures

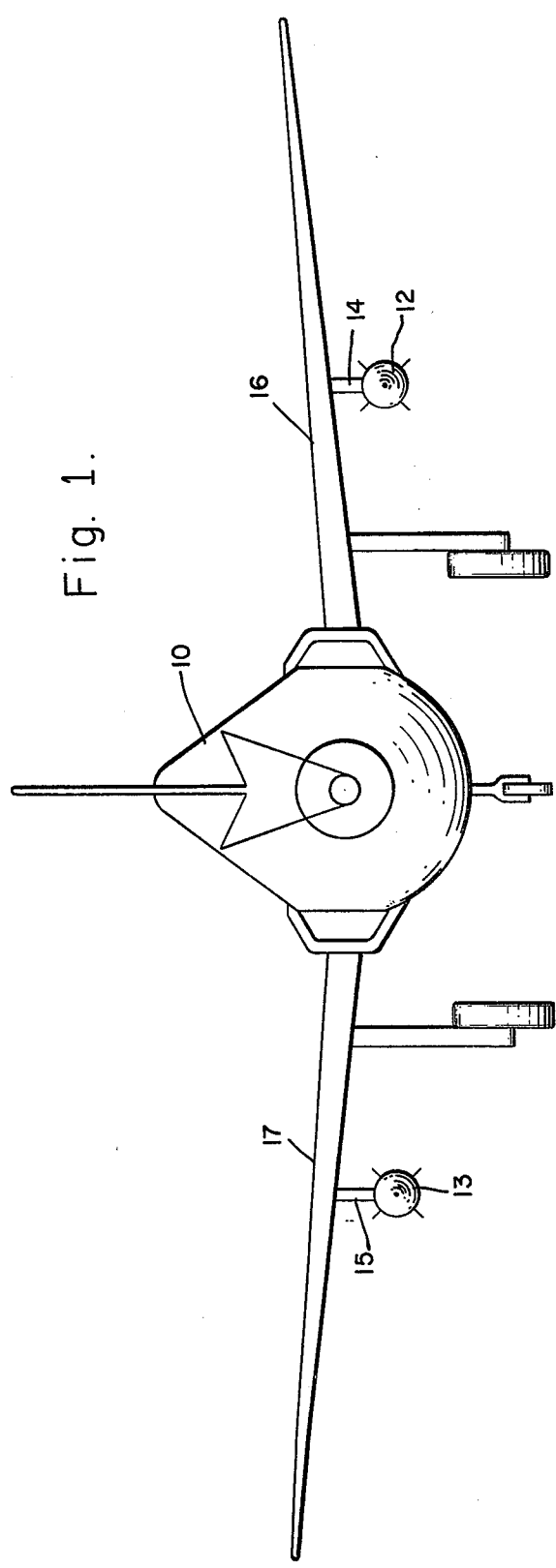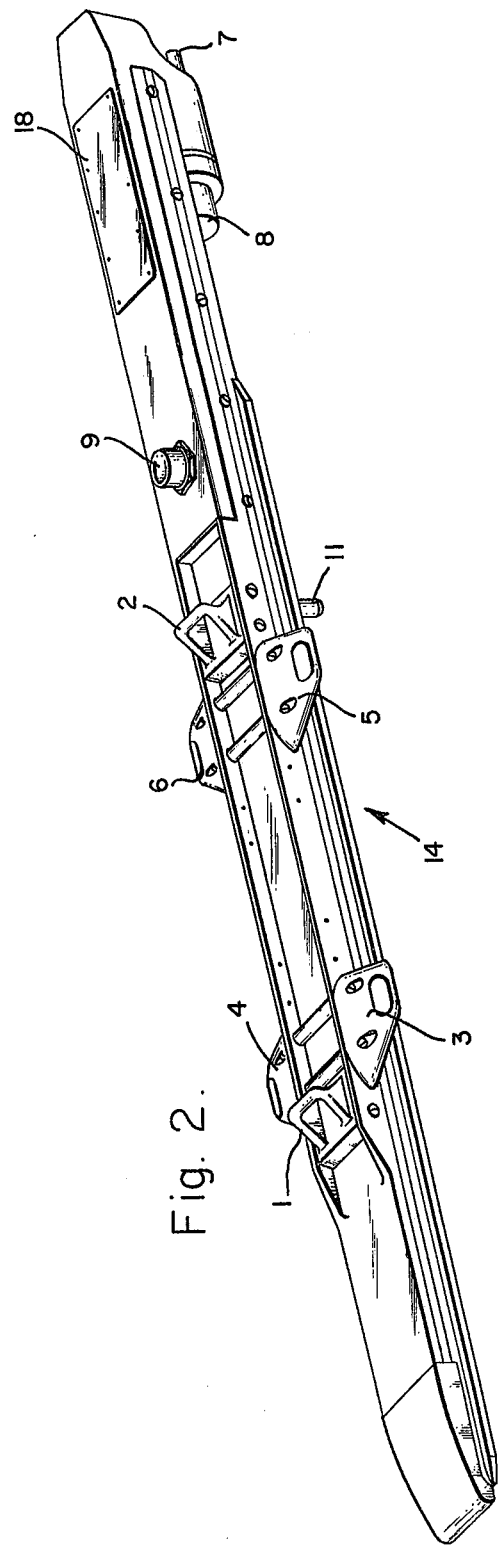

SINGLE RAIL MISSILE LAUNCHER WITH SHIFT REGISTER TIMING

BACKGROUND OF THE INVENTION

1. Field of the Invention

This invention relates to a digital shift register timing network, and more particularly to a shift register digital timing network in a single rail launcher for controlling the timing of the launch sequence for the missile.

2. Description of the Prior Art

In order to launch a missile, it is necessary to first follow several steps of preparation, which are initiated by a fire command from the pilot of the aircraft. After the missile leaves the launcher, it must provide its own power, which is supplied by the missile battery. This battery is activated shortly before the missile is launched to assure there is no interruption of the missile power during the missile launch. A certain amount of time must elapse after the activation of the battery and prior to the interruption of the power from the launcher to the missile in order to allow the battery to reach its operational condition. Next, after another predetermined amount of time, the missile rocket motor must be activated. These several steps in preparation for the missile launch must take place at exact times and for a predetermined duration.

In the art, the timing of the sequence of events for preparation and launch of the missile were accomplished by using analog timing networks or by using numerous binary counters. The present invention uses a series of shift registers to deliver the necessary timing sequence to the missile in order to accomplish launch of the missile. Since Complimentary Metal Oxide Semiconductor (CMOS) shift registers are used, the timing network of the present invention is simpler to manufacture, smaller in size and dissipates less power than prior art timing networks.

The digital timing network of the present invention is packaged inside the aft portion of the launcher. A *single rail* launcher is used instead of a three-rail launcher, so that the missile can be carried on lighter aircraft and to permit a flexible weapon mix under various tactical conditions. This single rail launcher is designed to carry and launch the *Maverick* missile.

SUMMARY OF THE INVENTION

The shift register timing network, in accordance with the invention, consists of a NAND gate, a flip-flop, and three shift registers, in a single rail launcher which delivers the proper timing sequence for the necessary steps in preparing and launching the missile when the pilot in the aircraft initiates a missile launch signal.

Accordingly, it is an object of this invention to provide a digital launch sequence timing network, for preparing and launching a missile.

Another object of this invention is to provide an improved timing system in a single rail launcher to automatically prepare and launch a missile.

A further object of the present invention is to provide a timing network, in a single rail launcher, composed of a plurality of shift registers.

Other objects and advantages of this invention will become apparent through the following portion of the specification, the claims, and the attached drawings.

BRIEF DESCRIPTION OF THE DRAWINGS

FIG. 1 is a front profile view of a typical fighter aircraft with two maverick single rail launchers and a maverick missile attached to each launcher.

FIG. 2 is a view of the maverick single rail launcher.

DETAILED DESCRIPTION

Figure 3:
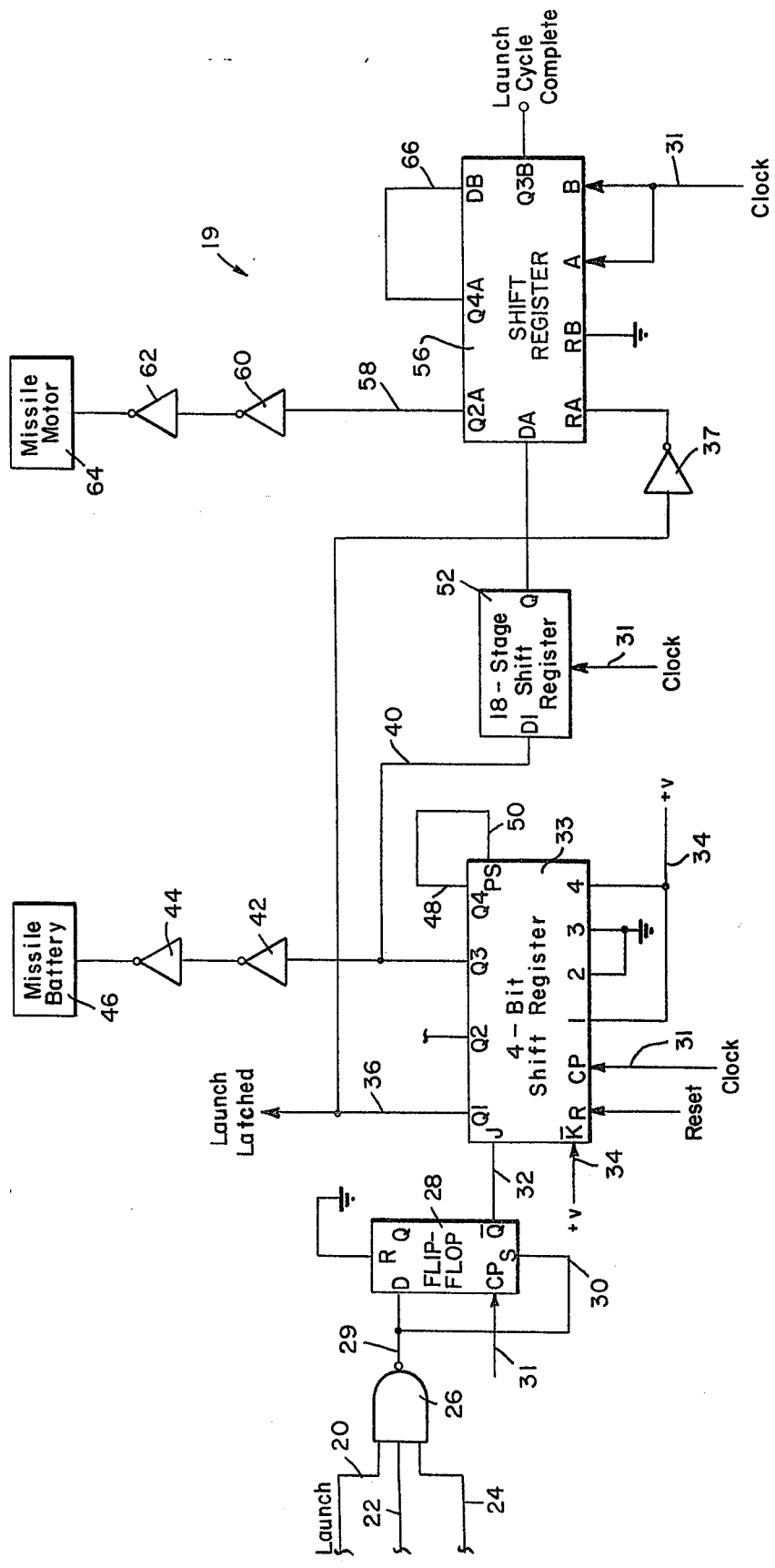
FIG. 3 is the schematic of the digital timing network of the maverick single rail launcher.

Referring now to FIG. 1, the aircraft 10 has two missiles 12 and 13 mounted upon separate launchers 14 and 15, which are attached to wings 16 and 17, respectively. The aircraft 10 can be of a light-weight type, since it is carrying only a single missile per wing. The missile launcher 14 interfaces between the aircraft and the missile to provide the necessary signals to successfully prepare and launch the missile.

FIG. 2 shows the single rail launcher 14, with its electronic assembly 18. The launcher provides the mechanical and electrical interface between the missile and its carrier aircraft. The launcher structure is a hollow aluminum alloy extrusion and accomodates the launcher functional equipment and bomb hooks 1 and 2, which attach the launcher to the wing of the aircraft. The four sway braces 3, 4, 5, and 6 prevent the missile from rotating while being carried by the launcher. Connector 7 receives signals from the aircraft and delivers them to the launcher electronics and missile umbilical connector 8 delivers signals from the launcher to the missile. Connector 9 delivers A/C from the aircraft to the launcher. Shear pin 11 is bolted through the hollow rail to provide missile longitudinal restraint and launch release.

In FIG. 3 there is shown the schematic of the shift register timing network of the present invention. NAND gate 26 has three inputs: the first input, via line 20, receives a firing or launch signal from the pilot, when it is his desire to initiate a launch; the second and third inputs, via lines 22 and 24, can be used as safety or operational interlocks. The output of NAND gate 26, via line 29, is connected to the input of delay flip-flop 28. The output of NAND gate 26 is also connected, via line 30, to the set of flip-flop 28 and the reset R is connected to ground. Also, a clock pulse 31 is delivered to flip-flop 28. The output Q of the flip-flop is connected to the J input, via line 32, of the synchronous 4-bit shift register 33. The K input of the shift register 33 is connected to +voltage 34, and the clock pulse input 31 is also entered to shift register 33. The Q1 output of shift register 33 is connected to launch latched, which locks the missile into the launch condition, and to launch signal inverter 37. The Q2 output of shift register 33 is not connected and the Q3 output is connected to logic signal inverter 42 and 44 which are connected to the missile battery power 46. The Q3 output of shift register 33 is also connected, via line 40, to the D1 input of an 18-stage shift register 52, which delays the input signal at D1 for 18 clock pulses. The output Q of shift register 52 is connected to the DA input of dual 4-bit shift register 56. The reset RA of shift register 56 is connected to the output of logic signal inverter 37. Reset RB of shift register 56 is connected to ground and clock inputs A and B are connected to the common clock line 31. The Q2A output is connected, via line 58, to logic inverters 60 and 62 which are connected to the missile rocket motor 64. The Q4A output is connected, via line 66, to the DB input of shift register 56; and the Q3B output of shift register 56 signals that the launch cycle is complete.

THE OPERATION

Figure 4:
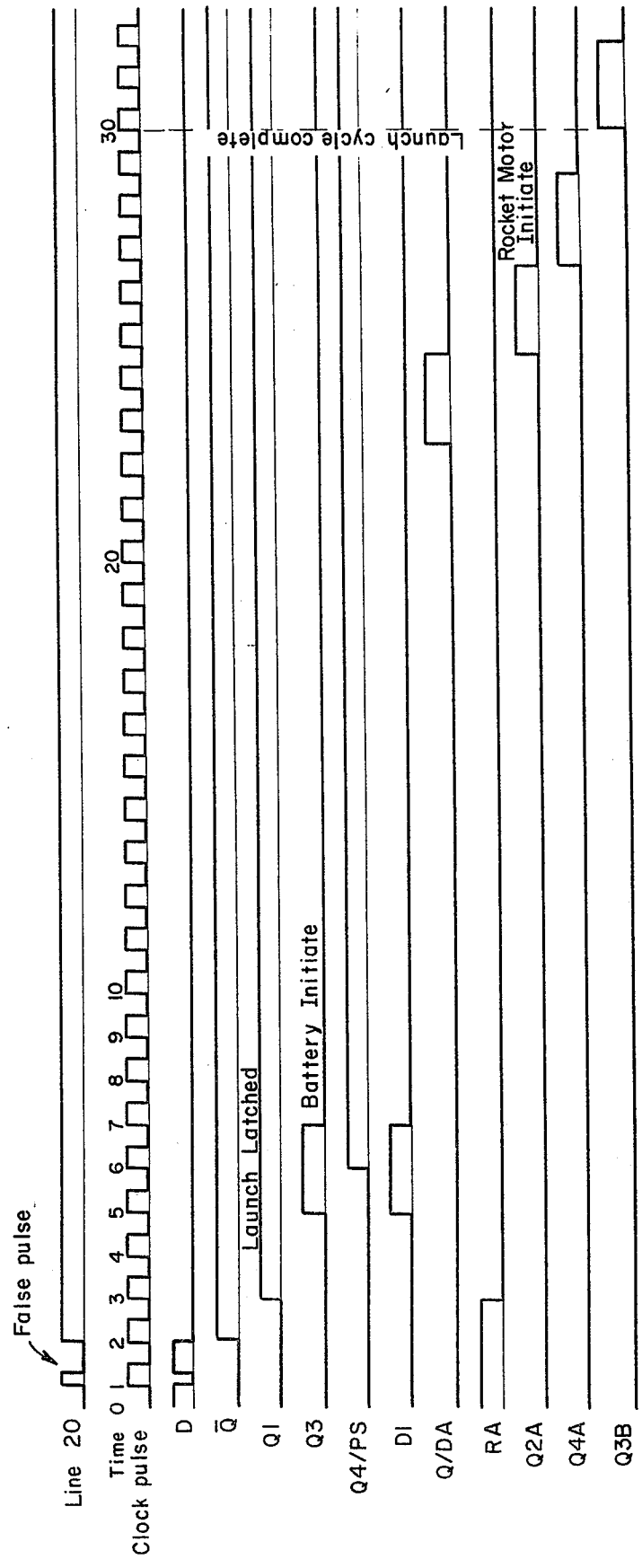
FIG. 4 is a timing diagram for the shift register timing network.

FIG. 4 is a timing diagram for the shift register timing network in order to show its operation. The normal condition of timing network 19, *before* the aircraft operator has initiated the launch signal, is shown in FIG. 4, at time t0. Line 20, to NAND gate 26, is at a logic low level, causing the D input to flip-flop 28 to be a logic high and the flip-flop's $\overline{Q}$ output to be low, thereby disabling the subsequent shift registers.

If a false pulse (a spike) should appear on line 20, at time t1 in FIG. 4, the D input to flip-flop 28 will go to a logic low level but the Q output will not go high until the rising edge of a clock pulse. If the pulse disappears prior to the next positive clock transistion, flip-flop 28 will immediately set disabling register 33, thereby providing a safe guard against false pulses causing the timing network 19 to accidently prepare and launch a missile.

When the pilot initiates a launch signal, the input 20 to NAND gate 26 goes to a logic high level; if the safety interlocks 22 and 24 are also a binary high, the output of NAND gate 26, via line 29, will be at a logic low level; therefore, the D input to the flip-flop 28 will also be at a low level. (see time *t*2 on FIG. 4) After the arrival of the first clock pulse from the clock pulse line 31, the $\overline{Q}$ output of flip-flop 28 will be at high level only if the output from NAND gate 26 has remained low for the entire period from one clock pulse until the next clock pulse. The purpose of this is to maximize safety by assuring that the irreversible functions of the missile are not initiated by a glytch or false signal to the launch input.

The $\overline{Q}$ output of the flip-flop 28 next enters the J input of the synchronous 4-bit shift register 33. The signal is shifted with each clock pulse, so that it appears one clock pulse later in time on the outputs Q1, Q2, Q3, and Q4, in sequence. When the signal reaches the Q3 output, a signal is delivered to activate the missile battery power 46. When the signal reaches the Q4 output, it is then fed into the parallel serial input 50; this causes the shift register 33 to accept the parallel inputs 1, 2, 3, 4, rather than the serial inputs from the J input. The parallel inputs are fixed; therefore, Q1 and Q4 are fixed at a logic high level; and Q2 and Q3 are fixed at a low level. Shift register 33 is locked into this mode until a reset signal is received, indicating that the launch has been completed. The signal from the Q3 output of shift register 33 has been high for a time period equalled to twice the interval between consecutive clock pulses and then it has returned false; this is shown in FIG. 4. Thus, the Q3 output generates a timing period which can be used to time the duration of the pulse to activate the missile battery 46.

The Q3 output of shift register 33 is next delivered to the D1 input of 18-stage shift register 52. As can be seen in FIG. 4, the D1 input to shift register 52 is delayed for 18 clock pulses and the register's output is delivered to the DA input of the dual 4-bit shift register 56.

When the RA reset of shift register 56 goes low, shift register 56 is able to accept data from the Q output of shift register 52. After two clock pulses, the signal at the DA input to shift register 56 appears at the Q2A output of said shift register. This output is used to time the duration of the missile rocket motor initiate pulse which is delivered, via line 58, to the missile rocket 64. The time between the end of the missile initiate pulse at 46 and the start of the missile rocket motor initiate pulse at 64 has been determined by the delay introduced by the 18-stage shift register 52. After two more clock pulses the signal at Q2A appears at output Q4A which is fed to the DB input of shift register 56. After a delay of three clock pulses, the signal at the DB input appears at the Q3B output of shift register 56. This delay indicates that sufficient time has elapsed for the missile to have left the launcher, so that the launch cycle complete signal, via line 68, can be generated and appropriate action taken to turn off or reset the launcher.

Although the device which has just been described appears to afford the greatest advantages for implementing the invention, it will be understood that various modifications can be made thereto without going beyond the scope of the invention, it being possible to replace certain elements by other elements capable of fulfilling the same technical functions therein.

What is claimed is:

1. A digital launch sequence timer in a single rail launcher for controlling the timing of the sequence of events necessary to launch the missile having a battery and a motor, and means under the control of the aircraft pilot for producing a launch signal for starting the timing sequence, wherein the improvement comprises:
    a NAND gate for receiving said launch signal, said NAND gate having an output;
    a first shift register being connected to said output of said NAND gate, said register having two outputs;
    said first output of first register for delivering a pulse of predetermined duration to activate the missile battery;
    a second shift register having a motor firing signal output, said second shift register having its input connected to said second output of said first register, said second shift register delaying the initiation of said firing signal by a predetermined period;
    said second register having an output carrying the delayed firing initiation signal; and
    a third shift register connected to said output of said second register for timing the duration of said launch pulse signal to said motor.

\* \* \* \* \*